US012406287B2

(12) United States Patent
Hadfield

(10) Patent No.: US 12,406,287 B2
(45) Date of Patent: Sep. 2, 2025

(54) OBJECT MODEL FOR PRORATION CALCULATIONS

(71) Applicant: Certinia Inc., Austin, TX (US)

(72) Inventor: James Hadfield, Leeds (GB)

(73) Assignee: Certinia Inc., Austin, TX (US)

( * ) Notice: Subject to any disclaimer, the term of this patent is extended or adjusted under 35 U.S.C. 154(b) by 553 days.

(21) Appl. No.: 16/843,018

(22) Filed: Apr. 8, 2020

(65) Prior Publication Data

US 2020/0334723 A1 Oct. 22, 2020

Related U.S. Application Data

(60) Provisional application No. 62/835,405, filed on Apr. 17, 2019.

(51) Int. Cl.
*G06Q 30/04* (2012.01)
*G06Q 10/1093* (2023.01)
(Continued)

(52) U.S. Cl.
CPC ......... *G06Q 30/04* (2013.01); *G06Q 10/1093* (2013.01); *G06Q 20/127* (2013.01); *G06Q 20/407* (2013.01); *H04L 67/62* (2022.05)

(58) Field of Classification Search
CPC ............... G06Q 30/04; G06Q 30/0283; G06Q 10/1093; G06Q 20/127; G06Q 20/407;
(Continued)

(56) References Cited

U.S. PATENT DOCUMENTS 6,829,621 B2 12/2004 Keller
8,316,296 B2 11/2012 Paek et al.
(Continued)

FOREIGN PATENT DOCUMENTS

WO 2005022353 A3 11/2005
WO 2019029721 A1 2/2019

OTHER PUBLICATIONS

Johnson et al., Services2Cloud: A Framework for Revenue Analysis of Software-as-a-Service Provisioning, Mar. 21, 2014, IEEE, 2013 IEEE 5th International Conference on Cloud Computing and Science, vol. 2, pp. 144-151 (Year: 2013).*
(Continued)

*Primary Examiner* — Robert D Rines
(74) *Attorney, Agent, or Firm* — Carr & Ferrell LLP

(57) ABSTRACT

The present embodiments relate to generation of an object model for unifying a proration calculation process for one or more clients of service providers. A first set of input parameters associated with a client subscribing to a service offered by a service provider may be identified. The first set of input parameters may include at least a scheduled duration, a value associated with the scheduled duration, and a proration calculation. A first time period associated with the client representing a duration that the client utilized the service may be identified. An overlap period representing the overlap between the scheduled duration and the first time period may be determined. A first prorated value may be generated by executing the proration calculation associated with the client. The prorated value may be based on the overlap period and the first set of input parameters.

25 Claims, 6 Drawing Sheets

(51) Int. Cl.
*G06Q 20/12* (2012.01)
*G06Q 20/40* (2012.01)
*H04L 67/62* (2022.01)

(58) Field of Classification Search
CPC ...... G06Q 20/145; G06Q 30/02; G06Q 10/10; H04M 15/66; H04L 67/1074; H04L 67/1087; H04L 67/02; H04L 67/62
See application file for complete search history.

(56) References Cited

U.S. PATENT DOCUMENTS

| | | | |
|---|---|---|---|
| 8,675,842 | B2 | 3/2014 | Franklin-Barr et al. |
| 9,262,218 | B2 | 2/2016 | Bostic et al. |
| 9,754,226 | B2 | 9/2017 | Zheng et al. |
| 10,169,035 | B1 | 1/2019 | Caspi |
| 10,224,035 | B1 | 3/2019 | Koenig et al. |
| 10,276,185 | B1 | 4/2019 | Ma et al. |
| 10,346,809 | B1 | 7/2019 | Byrne |
| 10,467,218 | B2 | 11/2019 | Willcock et al. |
| 10,616,402 | B2 | 4/2020 | Byrne |
| 10,635,748 | B2 | 4/2020 | Liu et al. |
| 10,636,013 | B2 | 4/2020 | Byrne |
| 10,880,429 | B2 | 12/2020 | Byrne |
| 10,902,385 | B2 | 1/2021 | Byrne |
| 11,043,217 | B2 | 6/2021 | Byrne |
| 11,256,860 | B2 | 2/2022 | Murashin |
| 11,321,293 | B2 | 5/2022 | Willcock et al. |
| 2002/0091707 | A1 | 7/2002 | Keller |
| 2004/0186763 | A1 | 9/2004 | Smith |
| 2005/0069103 | A1 | 3/2005 | DiVenuta et al. |
| 2005/0257148 | A1 | 11/2005 | Goodman et al. |
| 2007/0265962 | A1* | 11/2007 | Bowe, Jr. ............ G06Q 20/102 705/40 |
| 2008/0114683 | A1 | 5/2008 | Neveu et al. |
| 2010/0088205 | A1 | 4/2010 | Robertson |
| 2010/0131393 | A1* | 5/2010 | Pattabiraman ......... G06Q 50/32 705/30 |
| 2011/0276565 | A1 | 11/2011 | Zheng et al. |
| 2013/0031137 | A1 | 1/2013 | Chen et al. |
| 2013/0090090 | A1 | 4/2013 | Rivere |
| 2013/0191258 | A1* | 7/2013 | Zhu ........................ G06Q 30/02 705/34 |
| 2014/0012502 | A1 | 1/2014 | Joshi et al. |
| 2014/0114683 | A1 | 4/2014 | Natanzon et al. |
| 2014/0122143 | A1 | 5/2014 | Fletcher et al. |
| 2014/0156634 | A1 | 6/2014 | Buchmann et al. |
| 2014/0236884 | A1 | 8/2014 | Clark et al. |
| 2014/0344119 | A1 | 11/2014 | Haines |
| 2015/0032366 | A1 | 1/2015 | Man et al. |
| 2015/0094097 | A1 | 4/2015 | Fraccaroli |
| 2015/0127531 | A1* | 5/2015 | Dimmler ................ G06Q 20/14 705/40 |
| 2015/0161271 | A1 | 6/2015 | Gur et al. |
| 2015/0195344 | A1 | 7/2015 | Surendran et al. |
| 2016/0044352 | A1* | 2/2016 | Gratton ................ H04N 21/266 725/25 |
| 2017/0048339 | A1 | 2/2017 | Straub |
| 2017/0161651 | A1 | 6/2017 | Demarchi et al. |
| 2017/0206454 | A1 | 7/2017 | Jihn |
| 2017/0268892 | A1 | 9/2017 | Singh et al. |
| 2017/0293610 | A1 | 10/2017 | Tran |
| 2018/0081921 | A1 | 3/2018 | Willcock et al. |
| 2018/0197161 | A1* | 7/2018 | Kuzkin .................. G06Q 30/04 |
| 2018/0232786 | A1* | 8/2018 | Kuzkin .............. G06Q 20/0855 |
| 2018/0240165 | A1* | 8/2018 | Kilpatrick .............. G06Q 30/04 |
| 2019/0045050 | A1 | 2/2019 | Gallagher et al. |
| 2019/0158300 | A1* | 5/2019 | Sabella ............. H04M 15/8353 |
| 2019/0197489 | A1 | 6/2019 | Byrne |
| 2019/0199852 | A1 | 6/2019 | Byrne |
| 2019/0205368 | A1 | 7/2019 | Wang et al. |
| 2019/0279162 | A1 | 9/2019 | Byrne |
| 2019/0392828 | A1 | 12/2019 | Byrne |
| 2020/0050996 | A1 | 2/2020 | Generes, Jr. et al. |
| 2020/0089745 | A1 | 3/2020 | Murashin |
| 2020/0160253 | A1 | 5/2020 | Johnson et al. |
| 2020/0195774 | A1 | 6/2020 | Byrne |
| 2020/0219064 | A1 | 7/2020 | Byrne |
| 2021/0142249 | A1 | 5/2021 | Ellsworth et al. |
| 2021/0152688 | A1 | 5/2021 | Byrne |
| 2024/0394803 | A1* | 11/2024 | Jin ........................ G06Q 40/00 |

OTHER PUBLICATIONS

Byrne, Matthew, Notice of Allowance and Fee(s) Due mailed Feb. 19, 2021 for U.S. Appl. No. 16/240,457.

Cai et al., "Itinerary recommender system with semantic trajectory pattern mining from geo-tagged photos," Expert Systems With Applications, vol. 94, ISSN 0957-4174, pp. 2-40, URL: https://doi.org/10.1016/j.eswa.2017.10.049 (Year: 2018).

Corrielus, Jean M., Non-Final Office Action mailed Jan. 25, 2019 for U.S. Appl. No. 15/271,186.

Corrielus, Jean M., Non-Final Office Action mailed Sep. 28, 2021 for U.S. Appl. No. 16/601,125.

Corrielus, Jean M., Notice of Allowance and Fee(s) Due mailed Jan. 4, 2022 for U.S. Appl. No. 16/601,125.

Corrielus, Jean M., Notice of Allowance and Fee(s) Due mailed Jun. 12, 2019 for U.S. Appl. No. 15/271,186.

Dean JR., Joseph E., Non-Final Office Action mailed Jun. 27, 2019 for U.S. Appl. No. 16/420,076.

Dean JR., Joseph E., Non-Final Office Action mailed May 15, 2020 for U.S. Appl. No. 16/821,039.

Dean JR., Joseph E., Non-Final Office action mailed Nov. 24, 2021 for U.S. Appl. No. 16/952,033.

Dean JR., Joseph E., Non-Final Office Action mailed Oct. 26, 2021 for U.S. Appl. No. 16/952,032.

Dean, JR., Joseph E., Final Office Action mailed Jan. 8, 2020 for U.S. Appl. No. 16/420,076.

Dean, JR., Joseph E., Non-Final Office Action mailed Aug. 8, 2018 for U.S. Appl. No. 15/853,150.

Dean, JR., Joseph E., Non-Final Office Action mailed Mar. 20, 2020 for U.S. Appl. No. 16/801,845.

Dean, JR., Joseph E., Notice of Allowance and Fee(s) Due mailed Aug. 25, 2020 for U.S. Appl. No. 16/801,845.

Dean, JR., Joseph E., Notice of Allowance and Fee(s) Due mailed Feb. 14, 2019 for U.S. Appl. No. 15/853,150.

Dean, JR., Joseph E., Notice of Allowance and Fee(s) Due mailed Jan. 10, 2020 for U.S. Appl. No. 15/853,265.

Dean, JR., Joseph E., Notice of Allowance and Fee(s) Due mailed Jan. 31, 2020 for U.S. Appl. No. 16/420,076.

Dean, JR., Joseph E., Notice of Allowance and Fee(s) Due mailed Mar. 8, 2022 for U.S. Appl. No. 16/952,033.

Dean, JR., Joseph E., Notice of Allowance and Fee(s) Due mailed Sep. 18, 2020 for U.S. Appl. No. 16/821,039.

Elahee, MD S, Non-Final Office Action mailed Jun. 11, 2020 for U.S. Appl. No. 16/240,457.

Elahee, MD S., Advisory Action mailed Dec. 16, 2020 for U.S. Appl. No. 16/240,457.

Elahee, MD S., Final Office Action mailed Sep. 17, 2020 for U.S. Appl. No. 16/240,457.

Mercado Vargas, Ariel, Final Office Action mailed Jan. 1, 2021 for U.S. Appl. No. 16/130,946.

Mercado Vargas, Ariel, Non-Final Office Action mailed May 12, 2021 for U.S. Appl. No. 16/130,946.

Mercado Vargas, Ariel, Notice of Allowance and Fee(s) Due mailed Oct. 14, 2021 for U.S. Appl. No. 16/130,946.

Singletary, Tyrone E., Non-Final Office Action mailed Dec. 24, 2021 for U.S. Appl. No. 17/076,762.

* cited by examiner

OBJECT MODEL FOR PRORATION CALCULATIONS

CROSS-REFERENCE TO RELATED APPLICATIONS

This application claims the benefit of U.S. Provisional Patent Application No. 62/835,405, titled "OBJECT MODEL FOR PRORATION CALCULATIONS" and filed on Apr. 17, 2019, which is incorporated by reference herein in its entirety.

TECHNICAL FIELD

Various embodiments concern prorating a value and, more particularly, concern an object model for proration calculations for a value.

BACKGROUND

A service provider may offer various services to clients. For example, a service provider may be a technology company offering computer-implemented tools to clients, such as businesses, individuals, etc.

In exchange for offering services to clients, service providers generally assign a value (or cost) to the service provided. The value may include a quantifiable cost, such as a dollar amount. For example, a client may be billed a dollar amount in exchange for utilizing a computer-implemented tool offered by the service provider.

The value assigned to a service may be based on a measurable usage of the service or by a time duration that a client utilized (or "subscribed to") the service. A value assigned to a client based on usage may be increased according to a measurable metric associated with the client's utilization of the service (by gigabit of storage, gigabit of data transmission, number of times the service was accessed, etc.). Other systems may assign a value according to a predetermined time duration (or billing cycle). For example, if billing cycle occurs every month, the value may represent the cost for one month of subscribing to the service.

However, in many cases, clients may start or stop a subscription to a service during a predetermined time duration. For example, if a client subscribes to a service during a month-long time duration, the client may only utilize the service for a portion of the time duration. Similarly, if a client cancels a subscription to a service during the predetermined time duration, the client may only utilize the service for a portion of the predetermined time duration. In this event, the value associated with the predetermined time duration may be decreased (or "prorated") to account for this limited utilization of the service during the predetermined time duration.

SUMMARY

Some embodiments of the present disclosure concern object models for unifying a proration calculation process. A first set of input parameters associated with a client subscribing to a service offered by a service provider may be identified. The first set of input parameters may include at least a scheduled duration, a value associated with the scheduled duration, and a proration calculation. A first time period associated with the client representing a duration that the client utilized the service may be identified.

An overlap period representing the overlap between the scheduled duration and the first time period may be determined. A first prorated value may be generated by executing the proration calculation associated with the client. The prorated value may be based on the overlap period and the first set of input parameters.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
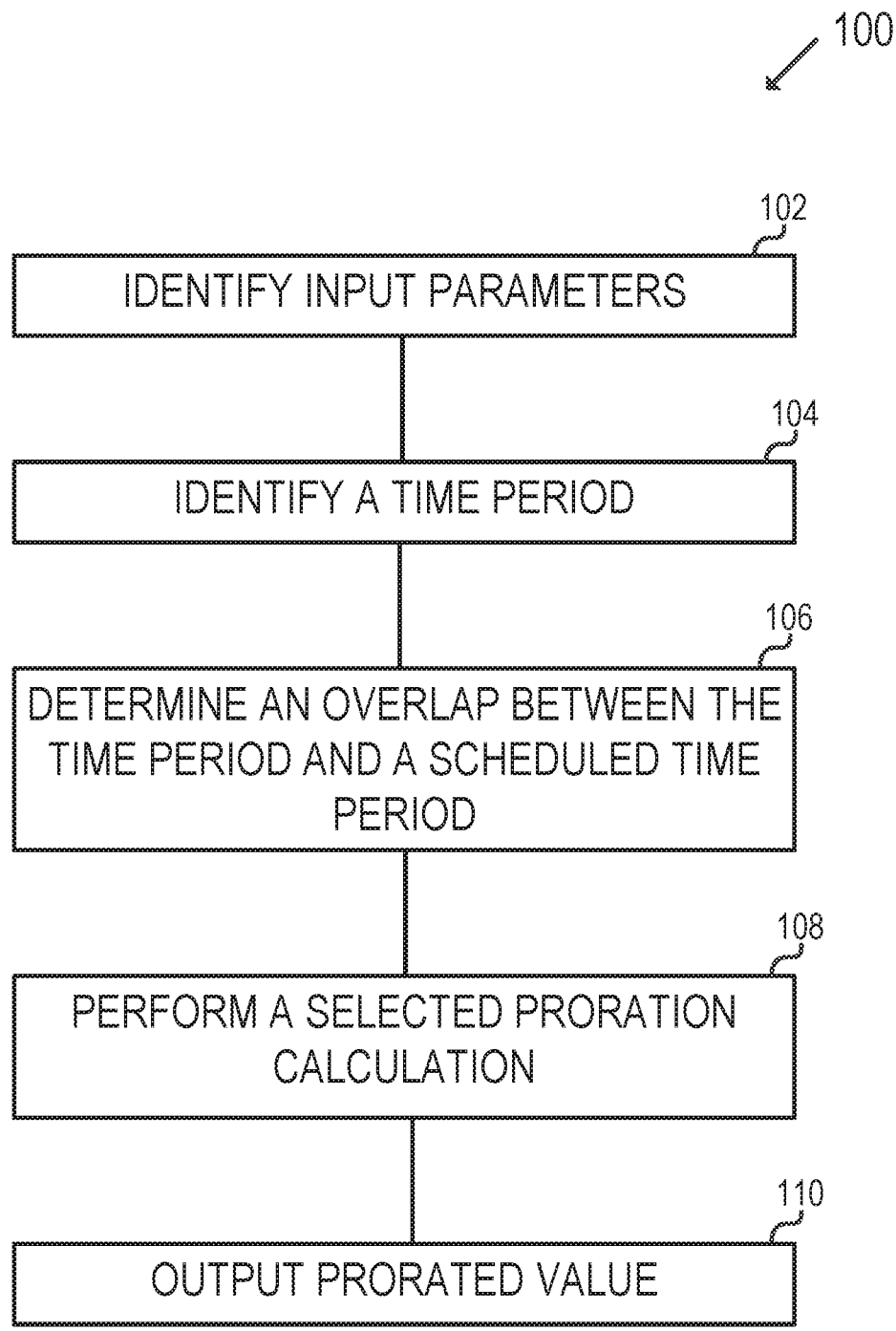
FIG. 1 illustrates a flowchart for generating a prorated value, in accordance with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Embodiments may be described with reference to particular computer programs, system configurations, networks, etc. However, those skilled in the art will recognize that these features are equally applicable to other computer program types, system configurations, network types, etc. For example, although the term "application" may be used to describe a computer program, the relevant feature may be embodied in another type of computer program.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device to perform a process for characterizing multiple media data, updating records in a database, etc.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview

Many companies (or "service providers") offer various services to clients. For example, a technology company may offer computer-implemented tools to a plurality of clients, such as other businesses, individuals, etc.

In many cases, service providers may assign a value to each computer-implemented tool. This value can represent a cost (e.g., dollar amount) assigned to the client in exchange for the use of the computer-implemented tool. One way that many service providers assign values to their services is via a subscription-based model, where a client 'subscribes' to the service and can utilize the service while subscribed.

Service providers may assign the value for use of the service during a scheduled duration (or "billing cycle"). The billing cycle can be based on a predetermined period (e.g., a fiscal quarter of a year) or any other duration identified by the service provider (every 50 days, every week, etc.). For example, a service provider may identify a scheduled duration for one month (e.g., from January 1 to January 31), and a value is associated with that month. In this example, if a client subscribes to a tool for the entire scheduled duration (e.g., between January 1 and January 31), the client may be billed or assigned the entire value.

The scheduled duration may be cyclical, i.e. every scheduled duration may be repeated with a value assigned to each scheduled duration in the cycle. As an example, a first scheduled duration (or billing period) may include the month of January, a second billing period may include the month of February, and so on.

In many cases, the time duration of each billing period over the course of time (e.g., a year) may be unequal. For example, a service provider may specify that a scheduled duration is every month. In this example, a first scheduled duration is from January 1 to January 31, or 31 days. A second scheduled duration may be from February 1 to February 28, or 28 days. Accordingly, the scheduled duration differs during each cycle. Based on this inequality, the assigned value for each billing period may be modified (or "prorated") to account for the changing duration of the billing period over the course of the year.

Additionally, in many cases, service providers provide services to a plurality of clients, and many clients may subscribe to and stop subscribing to the service over the course of a time period. For example, a first client may subscribe to a service on January 1, and a second client may subscribe to the same service on January 15. If the billing cycle is a month (e.g., from January 1 to January 31), the first client may be assigned the entire value associated with the billing cycle. However, because the second client only subscribed for a portion of the billing cycle, the second client may be assigned a prorated value that is less than the entire value, based on the shorter 16 day subscription period. Similarly, a third client may cancel an active subscription during the billing cycle (e.g., on January 15), and the value may be prorated based on the portion of the time period during the billing cycle that was cancelled.

Based on at least the reasons indicated above, service providers may perform a variety of proration calculations for specific clients. For example, a service provider may calculate a prorated value for clients using various proration calculations, based on the number of days in the current month. As another example, a service provider may have a plurality of clients, where clients may have unique billing cycles and associated proration calculations.

To account for the different proration calculations that may be utilized, many service providers may utilize computing devices with dedicated resources for each client of the service provider. For example, a server associated with a service provider may dedicate a first portion for a first client of the service provider. This first portion may include input information associated with the first client, such as a scheduled billing cycle, an associated bill value, a specific proration calculation for the first client, etc. Similarly, a second portion of a server may be dedicated to a second client of the service provider to perform proration calculations for the second client. Accordingly, in this example, the first portion can execute proration calculations for the first client and the second portion can separately execute proration calculations for the second client.

However, performing proration calculations for a plurality of clients associated with multiple service providers separately may decrease computational efficiency of a computing device. Separately storing and processing various proration calculations for a service provider may increase demand for computational resources to generate the proration calculations for clients of the service provider. Additionally, separately storing input information with each client of a service provider and separating proration calculations may decrease computational utilization efficiency, as a greater amount of computational resources may be expended to perform complex proration calculations for clients.

System Overview

The present embodiments relate to an object model to unify the proration calculation process for multiple clients of service providers. The object model may identify and access input information associated with an identified client of a service provider, such as a scheduled duration, an associated value, a proration calculation, etc. An overlap period representing an overlap between a scheduled duration and an actual period of use by the identified client may be determined, and a specified proration calculation associated with the client may be performed based on the overlap period and the identified input information.

The present embodiments may streamline the process of generating prorated values, particularly with multiple clients of service providers. The object model can identify input information and a selected proration calculation for an identified client among multiple clients subscribing to a services of service providers. The object model may increase computational efficiency to perform various proration calculations associated with various clients of service providers.

FIG. 1 illustrates a flowchart 100 for generating a prorated value, in accordance with various embodiments. As shown in FIG. 1, input parameters associated with a client of a service provider can be identified (block 102). Input parameters can include information associated with a client of a service provider to assist in generating a prorated value. As noted below, input parameters for multiple clients of one or more service providers may be stored or accessible to the object model.

The identified input parameters associated with a client of a service provider can include a scheduled duration. The scheduled duration can include a predetermined time period specified by the service provider. In some embodiments, the scheduled duration can be a billing period representing the time in which the client may be billed for utilizing a service of the service provider.

The scheduled duration can include a start date and end date. For example, a scheduled duration spanning the month of January can include a start date of January 1 and the end date of January 31. As another example, the scheduled duration can include a start date of January 15 and an end date of May 20. The scheduled duration may be cyclical i.e. a new iteration of the scheduled duration may begin at the end of a prior scheduled duration period.

However, the period of a first cycle of the scheduled duration may differ from a period of a second cycle of the scheduled duration. For example, the scheduled duration may include each month, where a first cycle of the scheduled duration may be a month that is 31 days long, and a second cycle of the scheduled duration may be a month that is 30 days long. Based on this difference, the resulting prorated value or a selected proration calculation may differ for each cycle of the scheduled duration.

The identified input parameters can include a value associated with the scheduled duration. A value can include a quantifiable metric associated with the scheduled duration, such as a dollar amount. In some embodiments, the scheduled duration indicates a billing cycle for the utilization of a service, and the value is a billing rate to be billed to the client for subscribing to the service during the billing cycle.

An actual time period representing the duration that a client has subscribed to a particular service offered by the service provider may be identified (block 104). For example, the actual time period may represent the duration that a client has subscribed to a computer-implemented tool offered by a service provider.

The actual time period associated with the client can include a start date and an end date. The start date may include the first date during the present scheduled duration that the client was subscribed to the service during the present scheduled duration, and the end date may include the last day that the client subscribed to the service during the present scheduled duration. As an example, if a scheduled duration includes the month of January (e.g., January 1 to January 31), an actual time period may include a start date of January 1 and an end date of January 20.

In one embodiment, the actual time period can encompass the entire period of a scheduled duration. For example, if a scheduled duration is the month of January (e.g., January 1 to January 31), and the actual time period for a client has a start date of January 1 and an end date of January 31, the client may be billed the entire value associated with the scheduled duration.

An overlap duration between the actual time period and the scheduled duration may be determined (block 106). For example, the scheduled duration is the month of January (or 31 days), and the actual time period is from January 1 to January 21 (or 21 days). In this example, the overlap duration may include 21 days (i.e. from January 1 to January 21). Further, in this example, the remaining time in the scheduled duration (e.g. from January 21 to January 31) may not be included in the overlap duration and a value may be prorated accordingly.

A proration calculation associated with the client can be performed based on the input parameters and the determined overlap duration (block 108). A prorated value may be determined using a selected proration calculation associated with the client based on the overlap duration that the client actually used or subscribed to the service. The prorated value may represent the prorated duration of the scheduled duration that a client subscribed to the service offered by the service provider.

The prorated value may be outputted (block 110). In some embodiments, the prorated value can be stored in a computing device (e.g., a server) or include an identifier to identify the prorated value as being associated with a particular client of the service provider. In another embodiment, the prorated value can be transmitted to a device associated with a service provider. One or more prorated values associated with client(s) of a service provider can be included in a report accessible to a service provider.

Similar steps may be performed for various clients of service providers. A prorated value for a client may be generated based on identifying a triggering event, such as receiving a request to perform a proration calculation, the occurrence of time-based alert to perform a proration calculation for a client or service provider, etc.

Figure 2:
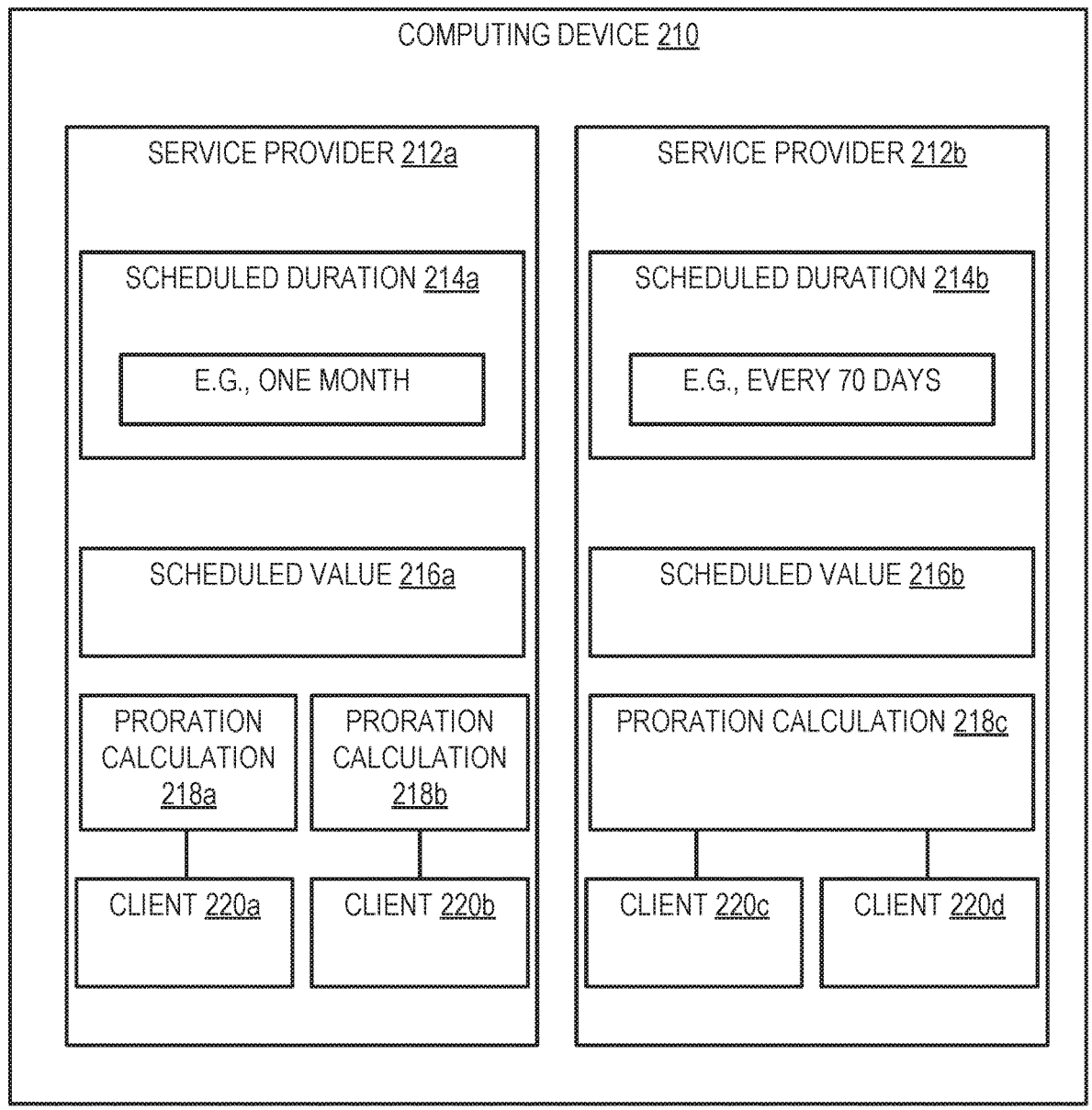
FIG. 2 illustrates an architecture of a computing device, in accordance with various embodiments.

FIG. 2 illustrates an architecture of a computing device 210, in accordance with various embodiments. The computing device 210, such as a computer, server, interconnected series of servers, etc., can store and access various information associated with multiple service providers and clients subscribing to services offered by each service provider. In some embodiments, the computing device 210 may include a plugin or application executing on the computing device 210.

As shown in FIG. 2, computing device 210 may include information relating to one or more service providers 212*a-b*. As noted above, a service provider may offer a service to multiple clients. The computing device 210 may store and/or access information associated with each service provider 212*a-b*.

The computing device 210 may access information representing a scheduled duration 214*a-b* associated with each service provider 212*a-b*. As noted above, the scheduled duration 214*a-b* may represent a time period in which the subscription of a service offered by a service provider is billed to clients.

For example, a first scheduled duration 214*a* may be associated with service provider 212*a*, and a second scheduled duration 214*b* may be associated with a second service provider 212*b*. In some embodiments, the scheduled duration 214*a-b* may be uniform for all clients of a service provider 212*a-b*. In other embodiments, the scheduled duration 214*a-b* may differ between clients of a service provider 212*a-b*. A service provider may provide information indicating one or more scheduled durations associated with clients of the service provider to the computing device 210.

As an example, first scheduled duration 214*a* includes a time period (or billing cycle) of one month, where the first scheduled duration 214*a* can repeat every month. Scheduled Second scheduled duration 214*b* can include a time period (or billing cycle) of every 70 days, where the second scheduled duration 214*b* repeats every 70 days.

A scheduled value 216*a-b* may be associated with each scheduled duration 214*a-b*. As noted above, the scheduled value 216*a-b* may include a quantifiable metric associated with the scheduled duration 214*a-b*. As an example, if scheduled duration 214*a* is a month, the scheduled value can include 100 dollars representing the value of subscribing to a service for the entire month.

The computing device 210 may store and/or access one or more proration calculations 218*a-c*. As noted above, a proration calculation 218*a-c* may include an identified series of steps or instructions performed by the computing device 210 to prorate or lessen a scheduled value 216 *a-b* based on information associated with a client 220*a-d* of a service provider 212*a-b*. For example, if a first client 220*a* subscribed to a service for half of the time included in a scheduled duration, a first proration calculation 218*a* may prorate a scheduled value 216*a* to a prorated value that is about half of the scheduled value 216*a*.

As shown in FIG. 2, a first proration calculation 218*a* may be associated with a first client 220*a* of a first service provider 212*a*, and a second proration calculation 218*b* may be associated with a second client 220*b* of the first service provider 212*a*. In some embodiments, all clients 220*c-d* of a second service provider 212*b* may include a uniform proration calculation 218*c*.

The computing device 210 may store information relating to a client 220*a-d* of a service provider 212*a-b*. Such information associated with a client 220*a-d* may be unique to that client 220*a-d*. For example, a first set of input parameters (e.g., an actual time period) may be associated with a first client 220*a*, and a second set of input parameters different than that of the first client 220*a* may be associated with a second client 220*b*.

In some embodiments, a set of input parameters associated with a client 220*a-d* may be identifiable by an indicator, such as a tag or header, for example. In another embodiment, a set of input parameters can be stored in a portion of a memory of the computing device, where the computing device 210 can retrieve the set of information by inspecting the portion of memory.

In some embodiments, the computing device 210 may identify a start date and/or end date for an actual period of a client subscribing to a service offered by a service provider. For example, if a first client 220*a* subscribes to a service on January 1, the computing device 210 may identify an actual time period start date of January 1 and associate the actual time period start date with the first client 220*a*. The actual time period for a client may be associated with a client such that the computing device 210 can retrieve the actual time period associated with that client.

Similarly, the computing device 210 may receive an indication that the second client (e.g., 220*b*) has stopped or cancelled their subscription to a service offered by a service provider on a specific date (e.g., January 20). In this event, the computing device 210 may identify an actual time period end date (e.g., January 20) and associate the end date with a client (e.g., second client 220*b*). The computing device 210 may store the actual time period of subscription to a service for each client 220*a-d*, where the actual time period may be utilized in identifying a prorated value for the client 220*a-d*.

Figure 3:
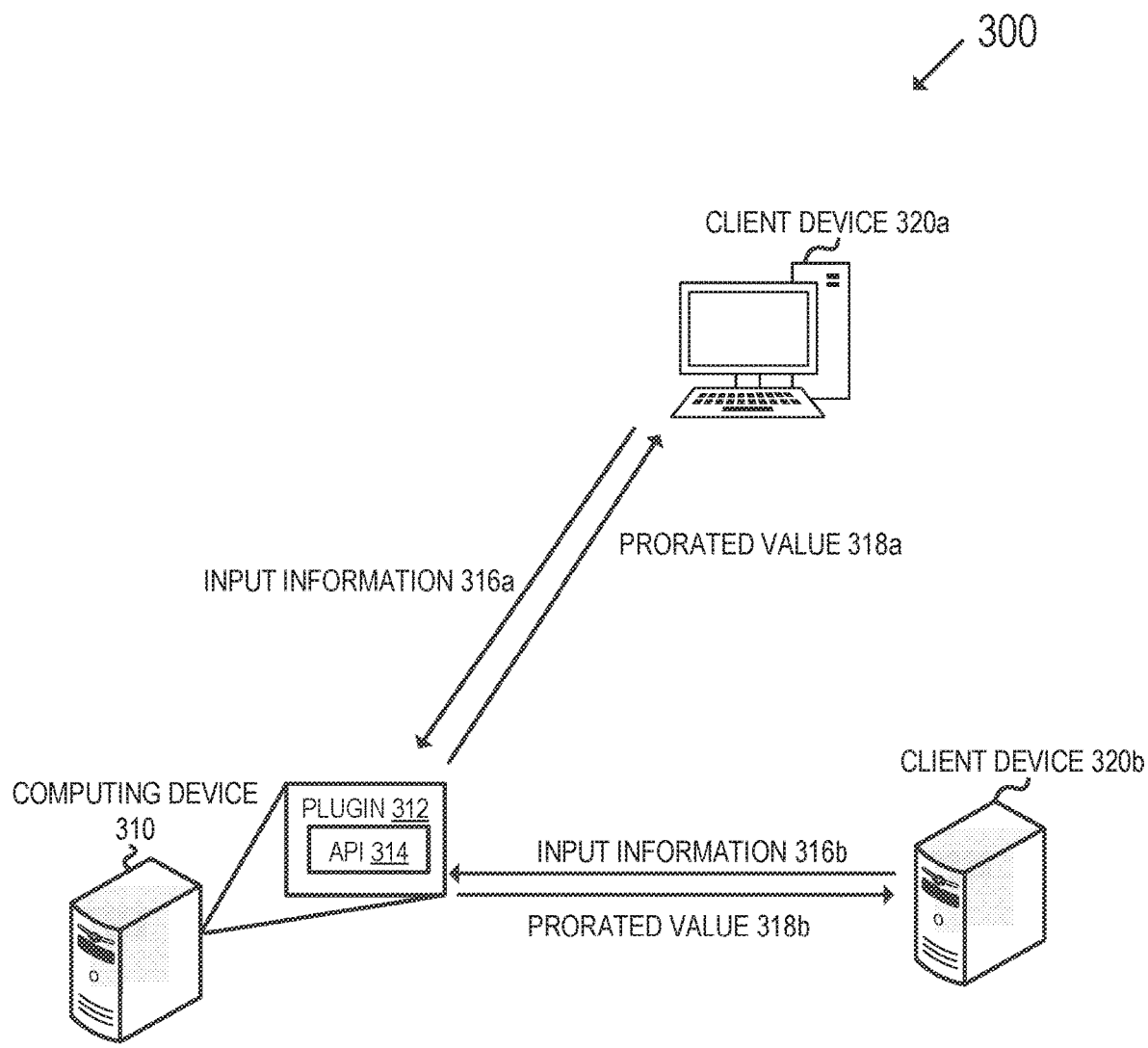
FIG. 3 illustrates a system to unify proration calculation process, in accordance with various embodiments.

FIG. 3 illustrates a system 300 to unify proration calculation process, in accordance with various embodiments. As shown in FIG. 3, computing device 310 may include a plugin 312 and an application programming interface (API) 314. The computing device 310 may include any or all of the features of computing device 210 as described with respect to FIG. 2.

A client device 320*a-b* may communicate with and provide information to computing device 310 via API 314. As an example, client device 320*a* may be associated with a first service provider, where the client device 320*a* may transmit input information (e.g., a scheduled duration, value) associated with a service provider over a network via API 314.

API 314 may provide an interface for a client device (client devices 320*a-b*) to communicate with and edit information stored on computing device 310. The API 314 can encrypt information transmitted between plugin 312 and a client device 320*a-b*. In some embodiments, client device 320*a* can transmit input information 316*a* to a plugin 312 executing on the computing device 310 via API 314. As an example, input information 316*a* can include an indication to modify a scheduled duration (or billing cycle) to include one month (e.g., the month of January).

The computing device 310 and/or the plugin 312 executing on the computing device 310 may identify a service provider associated with a client device 320*a-b* upon receipt of input information 316*a-b*. As an example, the plugin 312 may receive input information 316*a* from client device 320*a*, where the plugin 312 can inspect the input information 316*a* to identify an identifier (e.g., header, IP address, credential) associated with a service provider. Based on identifying the identifier associated with a first service provider, for example, the plugin 312 may store the received input information 316*a* and associate the information with the first service provider.

As noted above, client devices 320*a-b* may include devices associated with a service provider or a client of a service provider. The client device (e.g., 320*a*) can append or include an identifier, such as a credential, header, IP address, etc. identifying a service provider/client associated with the client device (e.g., 320*a*).

The plugin 312 executing on computing device 310 may include a set of instructions to generate an object model and generate prorated values for clients of service providers. Based on generating one or more prorated values for client(s) of a service provider, the prorated value(s) 318*a-b* may be transmitted or accessible to client devices 320*a-b* via API 314. In some embodiments, a plurality of prorated values 318*a-b* associated with clients of a service provider may be transmitted to a client device 320*a-b* via a report of prorated values for a scheduled duration.

Figure 4:
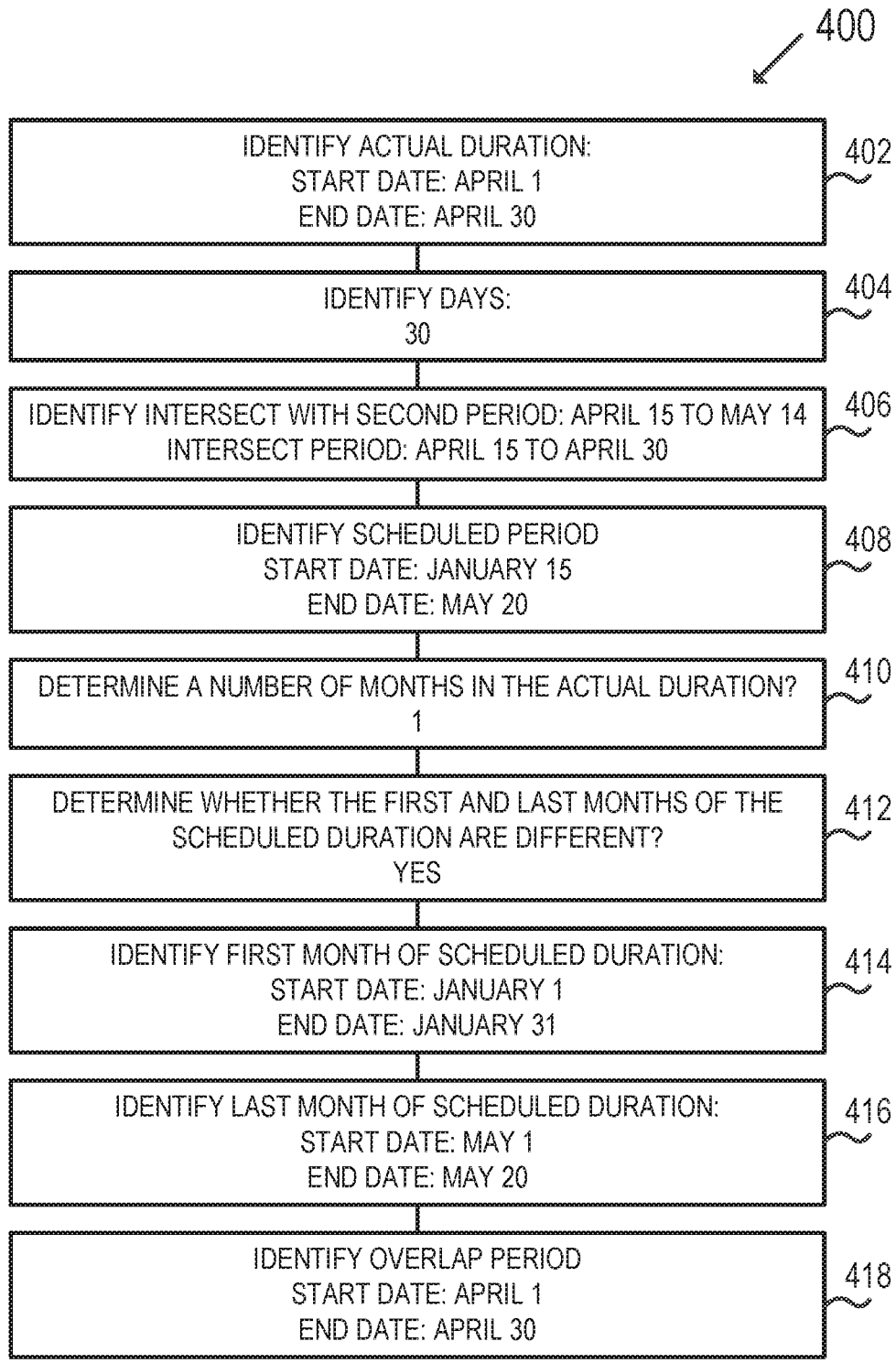
FIG. 4 illustrates a flow diagram for determining an overlap period, in accordance with various embodiments.

FIG. 4 illustrates an example flow diagram 400 for determining an overlap period, in accordance with various embodiments. As noted above, the overlap period may indicate an overlapping time period between a scheduled duration (or billing cycle) and an actual time period for a client of a service provider.

An actual duration indicating a time period that a client has utilized a service offered by a service provider may be identified (block 402). For example, a plugin executing on a computing device can identify a start date (April 1) and an end date (April 30) representing an actual duration that the client utilized the service during a scheduled duration.

Based on the actual duration start date and end date, a number of days may be determined (block 404). For example, determining a number of days with an actual time period starting April 1 and ending April 30 may output 30 days. In some embodiments, a computing device may reference an external database or registry to identify a number of days between a period in a given month or series of months. In another embodiment, a computing device may reference a calendar to identify a number of days included in an actual duration.

In some embodiments, an intersect representing an overlap between multiple time periods may be identified (block 406). An intersect can identify an intersection/overlap between two periods, and a new object model may be generated covering the intersection. An intersect may combine multiple billing periods for a client utilizing services of a service provider. If two periods do not overlap, an intersect period may not be generated/identified.

As an example, an actual duration can start April 1 and end April 30. A second period may start April 15 and end May 14. Accordingly, in this example, a new object covering the intersect period between April 15 April 30 may be created. In this example, a first period can include the non-intersection portion of the actual duration (April 1 to April 14), the second period can include the non-intersection portion of the second period (May 1 to May 14), and the intersect period can include the intersection portion (April 15 to April 30).

In some embodiments, it can be determined whether a selected day is within an identified actual duration. For example, the computing device can identify whether April 11 is included in an actual duration spanning from April 1 to April 30. In this example, the system would return 'true,' as April 11 is within the actual duration (e.g., April 1 to April 30). As another example, the computing device can determine whether May 1 is included in an actual duration spanning from April 1 to April 30. Here, however, the system would return 'false,' as May 1 is not within the actual duration (e.g., April 1 to April 30).

A scheduled duration associated with the service provider and/or the client of the service provider can be identified (block 408). As noted above, the scheduled duration can include a predetermined billing cycle for client(s) of a service provider. For example, the scheduled period can include a start date of January 15 and an end date of May 20. The scheduled duration can span one or more months.

A number of months between each repetition of the schedule may be identified (block 410). In the present example, the system may return a number of months between each repetition of the scheduled duration.

The present system can identify whether the first and the last periods of the schedule duration are different (block 412). Determining whether the first and last months are different may represent whether the scheduled duration spans multiple months. In the present example, the system can return 'true,' as a month starting the scheduled duration (e.g. January) is different than the month ending the schedule duration (e.g. May).

The system can identify whether the first month in the scheduled duration is a partial period. In this example, the system would return 'true,' as the first month in the scheduled duration (e.g., January) begins on January 15, which does not encompass the entire duration of January (i.e. from January 1 to January 31).

Similarly, the system can identify whether the last month in the scheduled duration is a partial period. In this example, the system would return 'true,' as the first month in the scheduled duration (e.g., May) begins on May 1 but ends on May 20, which does not encompass the entire duration of May (i.e. from May 1 to May 31).

A first month of the scheduled duration may be identified (block 414). In this example, the system determining the first period may return a period starting on January 15 and ending on January 31.

Similarly, the system can determine the last month within the scheduled period (block 416). In this example, the system may determine that the last month includes a period starting on May 1 and ending on May 20. Identifying the duration (or number of days) of the scheduled duration may impact proration calculations based on the scheduled duration, as the proration calculations are at least partially based on the scheduled duration.

The system can determine whether a specified date is the end date. Here, for example, the system can identify and identify date of May 20 as being the end date.

The system can determine whether a specified period is partial. For example, a period starting on January 15 and ending on January 31 would return 'true,' as that specified period is partial. As another example, the period starting on February 1 and ending on February 28 may return 'false,' as a specified period encompasses an entire month.

The system can identify a full period based on an identified date. For example, if a date of January 15 is identified, the full period may return as January 1 to January 31.

In any of the blocks as described herein, a computing device and/or plugin executing on the computing device may access or refer to a database, registry, calendar, external application, etc. to determine a specific date or date range requested. For example, the plugin may reference a calendar to identify a number of days included in the actual duration (block 402). As another example, the computing device may reference a database to identify a requested date range of the last month of the scheduled duration (block 416).

An overlap period representing an overlap between the actual duration and the scheduled duration may be identified (block 418). For purposes of illustration, the overlap period in the present example may include a period starting April 1 and ending April 30, which represents the overlap/matching dates between the actual duration (April 1 to April 30) and the scheduled duration (January 15 to May 20). Identifying the number of days included in both the actual duration and the scheduled duration may assist in generating prorated values, as the proration calculations may be based at least partially on the overlap period, the actual duration, and a scheduled duration associated with a service provider or a client of a service provider.

Figure 5:
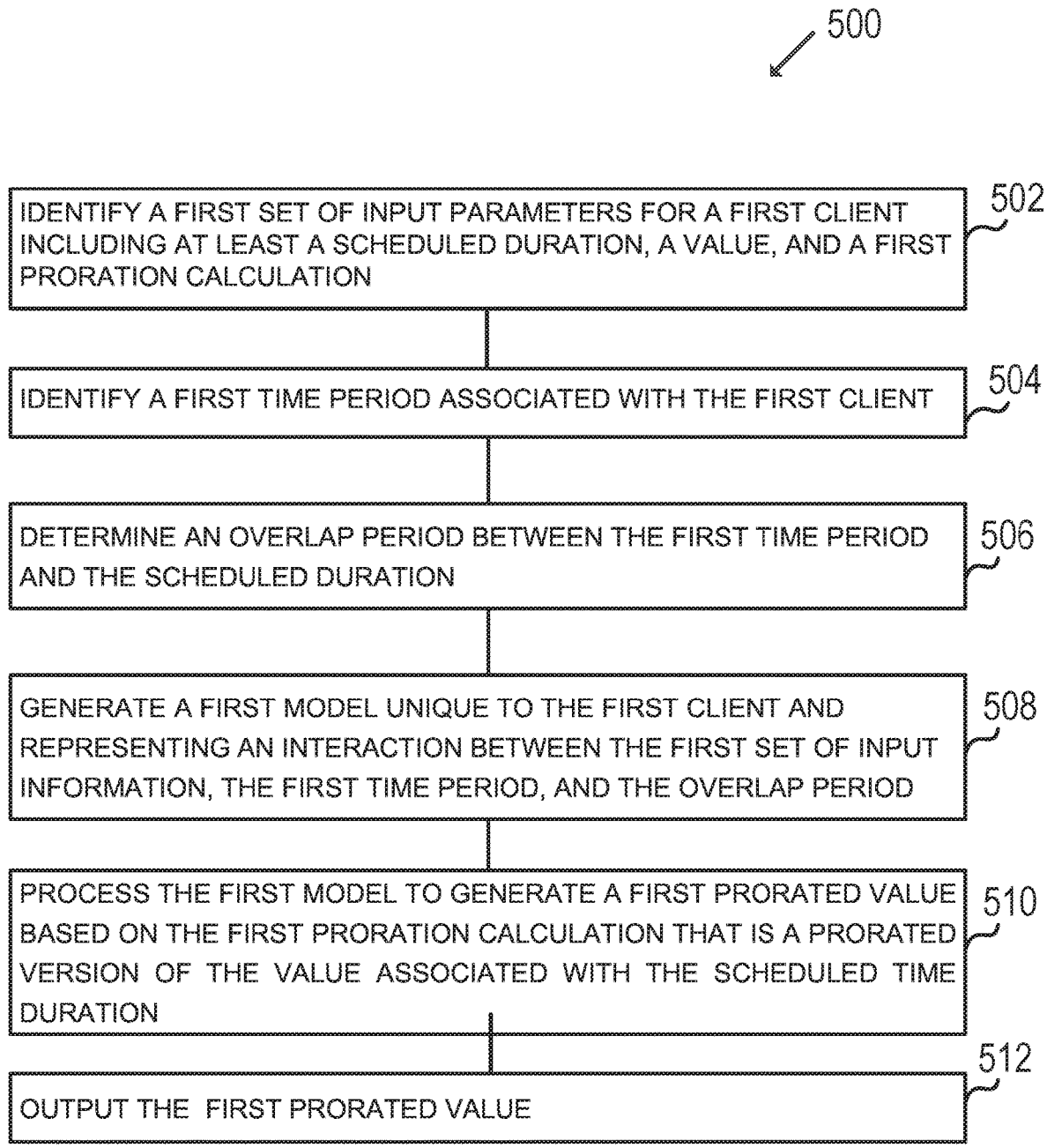
FIG. 5 illustrates a flow diagram of a method to unify a proration calculation process for clients of at least one service provider, in accordance with various embodiments.

FIG. 5 illustrates a flow diagram 500 of a method to unify a proration calculation process for clients of at least one service provider, in accordance with various embodiments. The present method may be performed on a computing device or a plugin executing on the computing device. Unifying a proration calculation process for multiple clients of a service provider may increase computational efficiency of a computing device, as the computing device may identify input information associated with various clients and generate prorated values for clients of a service provider with limited exhaustion of computational resources.

The method may include identifying a first set of input parameters associated with a first client of a first service provider, the first set of input parameters including a scheduled time duration, a scheduled value associated with the scheduled time duration, and a first proration calculation associated with the first client (block 502).

The scheduled time duration may include a billing cycle or scheduled period to bill a client of a service provider. A scheduled value may include a value or cost associated with the scheduled time duration. One or more proration calculations may be associated with a service provider, where a first proration calculation is associated with a first client of the service provider. In some embodiments, a first proration calculation may differ from a second proration calculation, where each proration calculation is accessible to a plugin executing on a computing device.

In some embodiments, identifying the first set of input parameters can include identifying an identifier associated with the first client and matching the identifier with an identifier included in the first set of input parameters. In some embodiments, the first set of input parameters are stored in a first portion of a memory of a computing device, where identifying the first set of input parameters includes retrieving information stored in the first portion of the memory.

The method may also include identifying a first time period associated with the first client, the first time period representing a duration that the first client subscribed to a service of the service provider (block 504). The first time period may represent the actual duration or actual period that a client utilizes a service offered by a service provider. In some embodiments, the actual period includes a number of days that is less than a number of days included in a scheduled duration.

The method may also include determining a first time period associated with the first client (block 506). An overlap duration may represent a part of the first time period that matches/overlaps the scheduled duration.

In some embodiments, the method may include identifying a second time period associated with the first client. The first time period and the second time period may be inspected to determine an intersect representing an overlap between the first time period and the second time period. If an intersect is identified, a new object representing the intersect period may be generated.

The method may also include generating a first model unique to the first client and representing an interaction between the first set of input information, the first time period, and the overlap period (block 508).

The method may also include processing the first model to generate a first prorated value based on the first proration calculation that is a prorated version of the value associated with the scheduled time duration (block 510).

In some embodiments, the method may include a plugin executing on a computing device receiving a request to generate the first prorated value for the first client from a device associated with the first service provider via an application programming interface (API). In this embodiment, the generation of the first prorated value may be based on receiving the request from the device associated with the first service provider.

The method may also include outputting the first prorated value (block 512). In some embodiments, outputting the first prorated value includes sending the first prorated value to a device associated with the first service provider via an API.

In some embodiments, the method may include adding the first prorated value into a proration report. The proration report may include a listing of generated prorated values associated with a service provider.

In some embodiments, an indication to generate a second prorated value for a second client of the service provider may be received. Based on receiving this indication, a second set of input parameters and a second time period associated with the second client may be identified. A second prorated value may be generated based on executing a second proration calculation associated with the second client.

In some embodiments, a third proration value may be generated for a third client of a second service provider based on input parameters associated with the third client.

In some embodiments, the method may include obtaining a request to generate a prorated value for a first client of a plurality of clients associated with a service provider.

The method can also include retrieving a first set of input information that is associated with the first client and unique to the first client. The first set of input information can include at least a scheduled time duration indicative of a predetermined time period that the first client is to utilize a service provided by the service provider, a value associated with utilizing the service provided by the service provider during the scheduled time duration, and a first proration calculation associated with the first client.

The method can also include identifying a first time period that the first client has utilized the service provided by the service provider.

The method can also include determining an overlap period indicating a similar time duration between the scheduled time duration and the first time period.

The method can also include executing the first proration calculation using the overlap period to generate a first prorated value that is a prorated version of the value associated with the scheduled time duration.

The method can also include sending the first prorated value to a first portion of memory associated with the first client.

In some embodiments, the method can include receiving the first set of input information from a first client device associated with the first client and storing the first set of input information in the first portion of memory associated with the first client, wherein each portion of memory is configured to maintain input information of each client of the service provider.

In some embodiments, outputting the first prorated value can include sending a report including the first prorated value to a first client device associated with the first client via an application programming interface (API).

In some embodiments, the method can include identifying a second time period associated with the first client. A second overlap time period can be determined indicating a common time duration between the scheduled time duration and the second time period. The first proration calculation can be executed utilizing the second overlap time period to generate a second prorated value prorated from the value associated with the scheduled time duration. The second prorated value may be combined with the first prorated value in a combined prorated value. The combined prorated value can be sent to the first portion of memory associated with the first client.

In some embodiments, the method can include determining an intersect period indicating a common time duration between the first time period and the second time period within the scheduled time duration. A new object can be generated that includes the intersect period. An intersect prorated value in the new object may be generated by executing the first proration calculation associated with the first time period and the second time period utilizing the intersect period. The intersect prorated value can be outputted with the combined first prorated value and the second prorated value.

In some embodiments, determining the overlap time period can include accessing a calendar module to determine a day value representing a number of days and a month value representing a number of months for both the first time period and the scheduled time period, and comparing the day values and month values of the first time period and the scheduled time period to determine an overlap month value and an overlap day value indicating common months and days between the scheduled time period and the first time period. An overlap time period can include the overlap month value and the overlap day value.

In some embodiments, retrieving the first set of input information can include identifying the first portion of memory associated with the first client, wherein each of a series of clients include information stored in a specific portion of memory. The first set of input information can be retrieved from the first portion of memory responsive to identifying the first portion of memory associated with the first client.

Example Proration Calculations

In the example proration calculations, a line soft date may represent a start of each scheduled duration. For example, 'WB+3d' may indicate a period starting 3 days (3d) after the beginning of each week (WB). As another example, 'QB' may indicate the first day of every quarter. As another example, 'MB' may indicate the first day of every month.

Example 1: Actual Day Calculation

In Example 1, a line period may include a line start date of Saturday, Aug. 12, 2017 and a line end date of Tuesday, Aug. 22, 2017. A line soft date may include WB+3d, or 3 days after the beginning of each week. A line sales price, or a value, may be 70 for each week.

A first period may span from a first date (August 12) to the last date of the scheduled duration (August 16, the second day after the beginning of the week starting August 14). The scheduled duration may include multiple iterations, with a first scheduled duration spanning from August 10 to August 16, and a second scheduled duration spanning from August 17 to August 23.

In this example, the first period may include 5 days (i.e. the number of days between August 12 and August 16). The first scheduled duration may include 7 days (i.e. the number of days between August 10 and August 16). Based on identifying the first period and the first scheduled duration, a first prorated value can be generated using a first proration calculation. Implementing the first proration calculation, the prorated value may be 5/7 by dividing the number of days in the first period by the number of days in the first scheduled duration. Multiplying the value (70) by the proration calculation (5/7) may result in a prorated value of 50.

Similarly, a final period prorated value can be generated. The second scheduled duration may include 7 days, from August 17 to August 23. However, the line end date is August 22. Accordingly, the final period may include 6 days (i.e. the number of days between August 17 and August 22).

Based on identifying the final period and the second scheduled duration, a second prorated value can be generated using a second proration calculation. Implementing the second proration calculation, the second prorated value may be 6/7 by dividing the number of days in the final period (6) by the number of days in the first scheduled duration (7). Multiplying the value (70) by the proration calculation (6/7) may result in a prorated value of 60.

Accordingly, for a line period starting on August 12 and ending August 22 for a client of a service provider, the total prorated values may result in 110. Table 1 below illustrates an example actual day calculation.

TABLE 1

| Line Start Date | Line End Date | Line Soft Date | Line Sales Price | First Period | Final Period |
| --- | --- | --- | --- | --- | --- |
| Sat 12th Aug. 2017 | Tue 22nd Aug. 2017 | WB + 3 d | £70 | 12th August to 16th August: 5 days<br>16th August - soft date adjustment = 10th August<br>10th August to 16th August: 7 days<br>£70 * (5/7) = £50 | 17th August to 22nd August: 6 days<br>17th August + soft date adjustment = 23rd August<br>17$^{th}$ August to 23rd August: 7 days<br>£70 * (6/7) = £60 |

Example 2: Whole Month Threshold

In Example 2, a line period may include a line start date of Mar. 19, 2017 and a line end date of Apr. 21, 2017. A line soft date may include QB, the beginning of each quarter of a year with a duration of a quarter of a year (January 1-March 31; April 1-June 30). A line sales price, or a value, may be 90 for each quarter.

A first period may span from a first date (March 19) to the last date of the scheduled duration (March 31, the last day of the quarter starting January 1). The scheduled duration may include multiple iterations, with a first scheduled duration spanning from January 1 to March 31, and a second scheduled duration spanning from April 1 to June 30.

In this example, the first period may include 13 days (i.e. the number of days between March 19 and March 31). The first scheduled duration may include 3 months. Each period may be compared against a threshold of 16 days, where if the number of days exceeds the threshold of 16 days, the line sales price for the entire month is applied. If the number of days in a period falls below the threshold, the total prorated value is 0 for that period.

Here, for example, the first period includes 13 days. 13 days is less than a threshold duration of 16 days, so the line sales price for the month of March is 0.

With the final period, the time between the start of the month April 1 and the line end date April 21 is 22 days. This time duration exceeds the threshold of 16 days, so the line sales price of the entire month of April applies. Accordingly, the client may be associated with a prorated value of ⅓ the line sales price of 90, or 30. Table 2 below illustrates an example whole month calculation.

TABLE 2

| Line Start Date | Line End Date | Line Soft Date | Line Sales Price | First Period | Final Period |
|---|---|---|---|---|---|
| 19 Mar. 2017 | 21 Apr. 2017 | QB | £90 | 19 March to 31 March = 13 days<br>W = 13/30.4 rounded down to whole number = 0<br>13 < 16 so R = 0<br>31 March - soft date adjustment = 1 January<br>1 January to 31 March = 3 months<br>£90 * (0/3) = £0 | 1 April to 21 April = 22 days<br>W = 22/30.4 rounded down to whole number = 0<br>22 > 16 so R = 1<br>1 April + soft date adjustment = 30 June<br>1 April to 30 June = 3 months<br>£90 * (1/3) = £30 |

Example 3: Setting Final Period to Remainder from First

In Example 3, a contract between a client and service provider may include a Proration Policy with Calculation Method of Actual Days with Adjust Final Period to Residual Amount from First Period checked.

In this example, the value (or sales price) is 2804 and the scheduled duration starting at the first day of each month (MB). In this example, a first period is from Feb. 21 2018 to Feb. 20 2018. A first period may span from Feb. 1 2018 to Feb. 28 2018, or 28 days. A prorated value for the first period may be 801.14, as ((28-21+1)/28)*2804=801.14.

Similarly, a final period value may include the remaining value for the first period, or 2804−801.14=2,002.86.

Example Processing System

Figure 6:
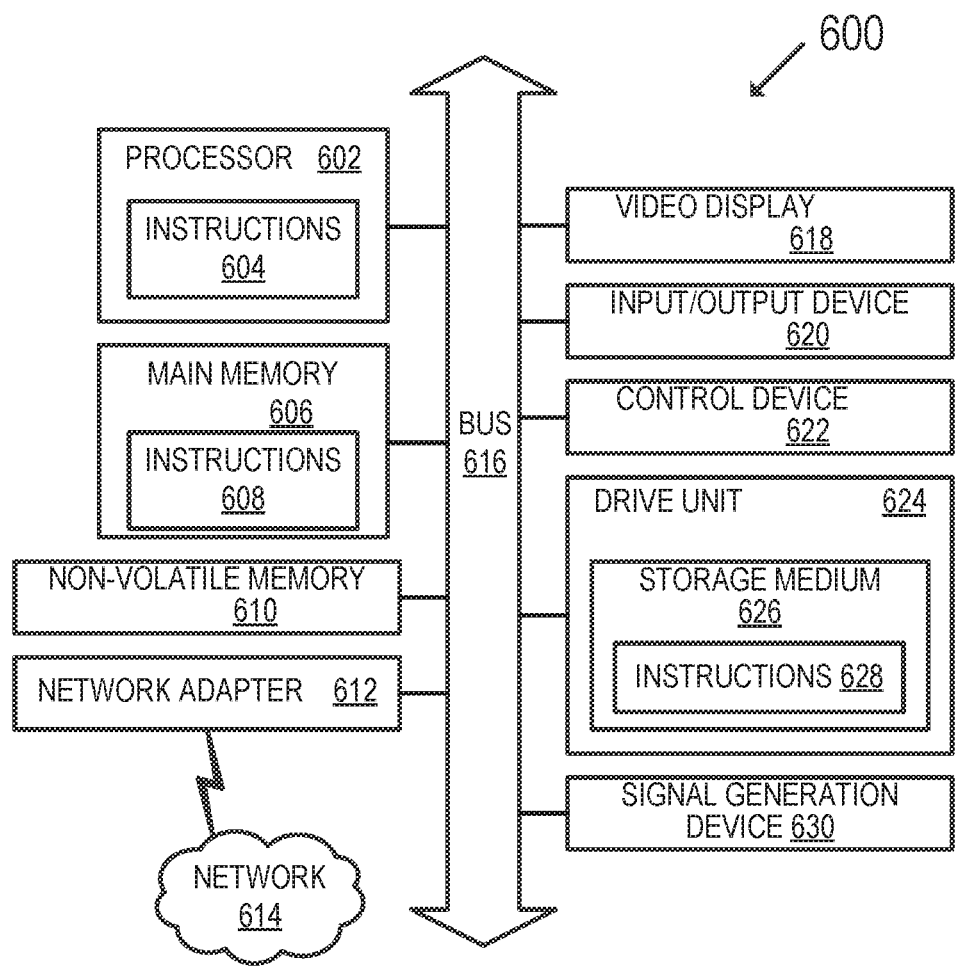
FIG. 6 is a block diagram illustrating an example of a processing system in which at least some operations described herein can be implemented.

FIG. 6 is a block diagram illustrating an example of a processing system 600 in which at least some operations described herein can be implemented. For example, some components of the processing system 600 may include computing device, such as computing device 310 in FIG. 3. As another example, some components of the processing system 600 may be hosted on a plugin (e.g., plugin 312 of FIG. 3).

The processing system 600 may include one or more central processing units ("processors") 602, main memory 606, non-volatile memory 610, network adapter 612 (e.g., network interface), video display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents one or more physical buses and/or point-to-point connections that are connected by appropriate bridges, adapters, or controllers. The bus 616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 600 may share a similar computer processor architecture as that of a desktop computer, tablet computer, personal digital assistant (PDA), mobile phone, game console, music player, wearable field device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the processing system 600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in a computing device. When read and executed by the one or more processors 602, the instruction(s) cause the processing system 600 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 610, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 612 enables the processing system 600 to mediate data in a network 614 with an entity that is external to the processing system 600 through any communication protocol supported by the processing system 600 and the external entity. The network adapter 612 can include a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 612 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method, on one or more processors, comprising:
   in a central processing unit including the one or more computer processors and memory storing executable code for at least one computer processor to execute a plurality of functions, including:
   automatically monitoring, by a plugin executing on the one or more computer processors, a plurality of input parameters for a plurality of clients associated with a service provider providing a service;
   automatically associating a specific portion of the memory for each client of the plurality of clients utilizing the service, the specific portion of the memory being populated and maintained with the plurality of input parameters respectively associated with the plurality of clients;
   automatically determining an allocation for the specific portion of the memory associated with each client based on client-specific input parameters, the plugin being configured to manage the allocated portion to improve computational efficiency;
   automatically identifying, by the plugin executing on the one or more computer processors, a first set of input parameters, related to the service, that is associated with a first client and unique to the first client of the plurality of clients, the first set of input parameters including at least a scheduled time duration indicative of a predetermined time period that the first client is to utilize a service provided by the service provider, a value associated with utilizing the service provided by the service provider during the scheduled time duration, and a first proration calculation associated with the first client, the first set of input parameters including a tag associated with the first client, the automatically identifying of the first set of input parameters further comprising:
      automatically identifying, by the plugin, a first identifier associated with the first client; and
      matching the first identifier with the tag included with the first set of input parameters;
   automatically storing, by the plugin executing on the one or more computer processors, the first set of input parameters in a first portion of the memory associated with the first client;
   obtaining, by the one or more computer processors, a request to generate a prorated value for the first client;
   automatically identifying, by the plugin executing on the one or more computer processors, a first time period that the first client has utilized the service provided by the service provider;
   determining, by the one or more computer processors, an overlap period indicating a similar time duration between the scheduled time duration and the first time period;
   automatically generating, by the plugin executing on the one or more computer processors, a first object model unique to the first client based in part on the first set of input parameters, the first object model representing an interaction between the first set of input parameters, the first time period, and the overlap period;
   automatically monitoring, by the one or more computer processors, for receipt of a triggering event;
   identifying, by the one or more computer processors, the triggering event;
   in response to the triggering event, adaptively processing, by the plugin executing on the one or more computer processors, the first object model to generate a first prorated value based on the first proration calculation that is a prorated version of the value associated with the scheduled time duration, whereby the prorated version of the value is associated with the first portion of the memory associated with the first client at a server, and one or more values, including the value associated with the scheduled time duration, are separately executed in association with another portion of the memory and another client, the first prorated value including a second identifier to identify the first prorated value as being associated with the first client;

sending, by the plugin executing on the one or more computer processors, the first prorated value to the first portion of the memory associated with the first client;

identifying, by the one or more computer processors, a second time period included in the scheduled time duration that indicates a second period that the first client has utilized the service provided by the service provider;

determining, by the one or more computer processors, a second overlap time period indicating a common time duration between the scheduled time duration and the second time period;

executing, by the one or more computer processors, the first proration calculation utilizing the second overlap time period to generate a second prorated value prorated from the value associated with the scheduled time duration;

determining, by the one or more computer processors, an intersect period indicating a common time duration between the first time period and the second time period within the scheduled time duration;

generating, by the plugin executing on the one or more computer processors, a new object model that includes the intersect period;

processing, by the plugin executing on the one or more computer processors, the new object model to generate an intersect prorated value by executing the first proration calculation associated with the first time period and the second time period utilizing the intersect period; and outputting, by the one or more computer processors, the intersect prorated value with a combined first prorated value and the second prorated value.

2. The computer-implemented method of claim 1, further comprising receiving, by the one or more computer processors, the first set of input parameters from a first client device associated with the first client.

3. The computer-implemented method of claim 1, wherein the outputting, by the one or more computer processors, the intersect prorated value with a combined first prorated value and the second prorated value, includes sending a report including the first prorated value to a first client device associated with the first client via an application programming interface (API).

4. The computer-implemented method of claim 1, further comprising:

obtaining a second set of input parameters associated with a second client, the second set of input parameters including at least a second scheduled time duration indicative of a predetermined time period that the second client is to utilize the service provided by the service provider, a second value associated with the second scheduled time duration, and a second proration calculation that is associated with the second client and different from the first proration calculation;

identifying a second time period of the second client indicating a period during the second scheduled time duration that the second client has utilized the service provided by the service provider;

determining a second overlap time period of the second client indicating a common time duration between the second scheduled time duration and the second time period of the second client;

executing the second proration calculation utilizing the determined second overlap time period of the second client to generate a second prorated value of the second client that is prorated from the second value associated with the second scheduled time duration; and sending a second report including the second prorated value of the second client to a second client device associated with the second client via an application programming interface (API).

5. The computer-implemented method of claim 1, wherein determining the overlap time period includes:

accessing, by the one or more computer processors, a calendar module to determine a day value representing a number of days and a month value representing a number of months for both the first time period and the scheduled time period; and comparing, by the one or more computer processors, the day values and the month values of the first time period and the scheduled time period to determine an overlap month value and an overlap day value indicating common months and days between the scheduled time period and the first time period, wherein the overlap time period includes the overlap month value and the overlap day value.

6. The computer-implemented method of claim 1, wherein the automatically identifying the first set of input parameters further includes:

identifying, by the one or more computer processors, the first portion of the memory associated with the first client, wherein each of a series of clients include information stored in a specific portion of the memory, wherein the first set of input parameters is retrieved from the first portion of the memory responsive to identifying the first portion of the memory associated with the first client.

7. The computer-implemented method of claim 1, wherein the tag associated with the first client comprises an indicator or a header.

8. The computer-implemented method of claim 1, wherein the triggering event comprises receiving an electronic notification of a termination or a subscription cancellation of a service that was offered by the service provider to the first client.

9. The computer-implemented method of claim 1, wherein the triggering event comprises at least one of an occurrence of a time-based alert to perform a proration calculation for the first client or the service provider and receiving an electronic notification to perform a proration calculation.

10. The computer-implemented method of claim 1, further comprising a set of computer instructions for configuring the first object model and the new object model for unifying the proration calculation process for a plurality of clients of service providers.

11. A computing device to generate prorated values for one or more clients, the computing device comprising:

a processor;

one or more computer readable storage media; and program instructions stored on the one or more computer readable storage media for execution by the processor, the program instructions comprising:

program instructions to create an application programming interface (API), associated with a service on the computing device connecting the computing device to a first client device associated with a first client, the API configured to:

program instructions to receive a first set of input parameters from the first client device among multiple sets of input parameters associated with various clients, the first set of input parameters including at least a scheduled time duration indicative of a predetermined time period that the first client is to utilize the service provided by a service provider, to execute, by the processor, a value associated with utilizing the service provided by the service provider during the scheduled time duration and a first proration calculation associated with the first client; and an application, executable by the processor on the computing device, configured to:

automatically monitor, by a plugin, a plurality of input parameters for a plurality of clients associated with the service provider;

automatically associate a specific portion of a memory for each client of the plurality of clients utilizing the service, the specific portion of a memory being populated and maintained with the plurality of input parameters respectively associated with the plurality of clients;

automatically determine an allocation for the specific portion of memory associated with each client based on client-specific input parameters, the plugin being configured to manage the allocated portion to improve computational efficiency;

automatically identify, by the plugin, the first set of input parameters that is associated with the first client and the service and unique to the first client of the plurality of clients, the first set of input parameters further including a tag associated with the first client, the identifying of the first set of input parameters further comprising:
    automatically identifying, by the plugin, a first identifier associated with the first client; and
    automatically matching the first identifier with the tag included with the first set of input parameters and associated with the service;

automatically store, by the plugin, the first set of input parameters in a first portion of the memory associated with the first client;

automatically identify, by the plugin, a first time period indicating a period that the first client has utilized the service provided by the service provider;

determine an overlap period indicating a similar time duration between the scheduled time duration and the first time period;

automatically generate, by the plugin, a first object model unique to the first client based in part on the first set of input parameters, the first object model representing an interaction between the first set of input parameters, the first time period, and the overlap period;

automatically monitor for receipt of a triggering event;

identify the triggering event;

in response to the triggering event, adaptively process, by the plugin, the first object model to generate a first prorated value based on the first proration calculation that is a prorated version of the value associated with the scheduled time duration, whereby the prorated version of the value is associated with the first portion of the memory associated with the first client at a server and one or more values, including the value associated with the scheduled time duration, are separately executed in association with another portion of the memory and another client, the first prorated value including a second identifier to identify the first prorated value as being associated with the first client;

send, by the plugin, the first prorated value to the first portion of the memory associated with the first client;

identify a second time period included in a first scheduled time duration that indicates a second period that the first client has utilized the service provided by the service provider;

determine a second overlap time period indicating a common time duration between the scheduled time duration and the second time period;

execute the first proration calculation utilizing the second overlap time period to generate a second prorated value prorated from the value associated with the first scheduled time duration;

determine an intersect period indicating a common time duration between the first time period and the second time period within the first scheduled time duration;

generate a new object model that includes the intersect period;

generate an intersect prorated value in the new object model by executing the first proration calculation associated with the first time period and the second time period utilizing the intersect period; and output the intersect prorated value with a combined first prorated value and the second prorated value.

12. The computing device of claim 11, wherein the application executable by the processor on the computing device is further configured to transmit a report that includes first prorated value to the first client device via the API.

13. The computing device of claim 11, wherein the application executable by the processor on the computing device is further configured to:
    determine a day value representing a number of days and a month value representing a number of months for both the first time period and the first scheduled time period using a calendar module; and
    compare the day values and the month values of the first time period and the first scheduled time period to determine an overlap month value and an overlap day value indicating common months and days between the first scheduled time period and the first time period, wherein the first overlap time period includes the overlap month value and the overlap day value.

14. The computing device of claim 11, wherein the application executable by the processor on the computing device is further configured to:
    obtain a second set of input parameters associated with a second client, the second set of input parameters including at least a second scheduled time duration indicative of a predetermined time period that the second client is to utilize the service provided by the service provider, a second value associated with the second scheduled time duration, and a second proration calculation that is associated with the second client and different from the first proration calculation;
    identify a second time period of the second client indicating a period during the second scheduled time duration that the second client has utilized the service provided by the service provider;
    determine a second overlap time period of the second client indicating a common time duration between the second scheduled time duration and the second time period of the second client;
execute the second proration calculation utilizing the determined second overlap time period of the second client to generate a second prorated value of the second client that is prorated from the second value associated with the second scheduled time duration; and
send a second report including the second prorated value of the second client to a second client device associated with the second client via the API.

15. The computing device of claim 11, wherein the application executable by the processor on the computing device is further configured to:
identify the first portion of the memory associated with the first client, wherein each of a series of clients include input parameters stored in a specific portion of the memory, wherein the first set of input parameters is retrieved from the first portion of the memory responsive to identifying the first portion of the memory associated with the first client, wherein each set of input parameters includes a proration calculation unique to one or more of a plurality of clients.

16. The computing device of claim 11, further comprising a set of computer instructions for configuring the first object model and the new object model for unifying the proration calculation process for the plurality of clients of the service providers.

17. The computing device of claim 11, wherein the triggering event comprises at least one of a time-based alert for generating a prorated value, receiving an electronic notification of a termination or a subscription cancellation of a service that was offered by the service provider, and receiving an electronic notification to perform a proration calculation.

18. A tangible, non-transient computer-readable medium having instructions stored thereon that, when executed by a processor of a computing device, cause the processor to:
automatically monitor, by a plugin, a plurality of input parameters for a plurality of clients associated with a service provider providing a service;
automatically associate a specific portion of a memory for each client of the plurality of clients utilizing the service, the specific portion of a memory being populated and maintained with the plurality of input parameters respectively associated with the plurality of clients;
obtain a request to generate a prorated value for a first client of a plurality of clients associated with the service provider;
automatically determine an allocation for the specific portion of memory associated with each client based on client-specific input parameters, the plugin being configured to manage the allocated portion to improve computational efficiency;
automatically identify, by the plugin, a first set of input parameters, related to the service, that is associated with the first client and unique to the first client of the plurality of clients, the first set of input parameters including at least a scheduled time duration indicative of a predetermined time period that the first client is to utilize the service provided by the service provider, a value associated with utilizing the service provided by the service provider during the scheduled time duration, and a first proration calculation associated with the first client, the first set of input parameters including a tag associated with the first client, the automatically identifying of the first set of input parameters further comprising:
automatically identifying, by the plugin, a first identifier associated with the first client; and
automatically matching the first identifier with the tag included with the first set of input parameters;
automatically store, by the plugin, the first set of input parameters in a first portion of the memory associated with the first client;
automatically identify, by the plugin, a first time period that the first client has utilized the service provided by the service provider;
determine an overlap period indicating a similar time duration between the scheduled time duration and the first time period;
automatically generate, by the plugin, a first object model unique to the first client based in part on the first set of input parameters, the first object model representing an interaction between the first set of input parameters, the first time period, and the overlap period;
automatically monitor for receipt of a triggering event;
identify the triggering event;
in response to the triggering event, adaptively process, by the plugin, the first object model to generate a first prorated value based on the first proration calculation that is a prorated version of the value associated with the scheduled time duration, whereby the prorated version of the value is associated with the first portion of the memory associated with the first client at a server, and one or more values, including the value associated with the scheduled time duration, are separately executed in association with another portion of the memory and another client, the first prorated value including a second identifier to identify the first prorated value as being associated with the first client;
send, by the plugin, the first prorated value to the first portion of the memory associated with the first client;
identify a second time period included in the scheduled time duration that indicates a second period that the first client has utilized the service provided by the service provider;
determine a second overlap time period indicating a common time duration between the scheduled time duration and the second time period;
execute the first proration calculation utilizing the second overlap time period to generate a second prorated value prorated from the value associated with the scheduled time duration;
determine an intersect period indicating a common time duration between the first time period and the second time period within the scheduled time duration;
generate a new object model that includes the intersect period;
generate an intersect prorated value in the new object model by executing the first proration calculation associated with the first time period and the second time period utilizing the intersect period; and
output the intersect prorated value with a combined first prorated value and the second prorated value.

19. The computer-readable medium of claim 18, further causing the processor to:
receive the first set of input parameters from a first client device associated with the first client; and
store the first set of input parameters in the first portion of the memory associated with the first client, wherein each portion of the memory is configured to maintain input parameters of each client of the service provider.

20. The computer-readable medium of claim 18, wherein the output the intersect prorated value with a combined first prorated value and the second prorated value includes sending a report including the first prorated value to a first client device associated with the first client via an application programming interface (API).

21. The computer-readable medium of claim 18, further causing the processor to:

obtain a second set of input parameters associated with a second client, the second set of input parameters including at least a second scheduled time duration indicative of a predetermined time period that the second client is to utilize the service provided by the service provider, a second value associated with the second scheduled time duration, and a second proration calculation that is associated with the second client and different from the first proration calculation;

identify a second time period of the second client indicating a period during the second scheduled time duration that the second client has utilized the service provided by the service provider;

determine a second overlap time period of the second client indicating a common time duration between the second scheduled time duration and the second time period of the second client;

execute the second proration calculation utilizing the determined second overlap time period of the second client to generate a second prorated value of the second client that is prorated from the second value associated with the second scheduled time duration; and send a second report including the second prorated value of the second client to a second client device associated with the second client via an application programming interface (API).

22. The computer-readable medium of claim 18, wherein the determine the overlap time period includes:

access a calendar module to determine a day value representing a number of days and a month value representing a number of months for both first time period and the scheduled time period; and compare the day values and the month values of the first time period and the scheduled time period to determine an overlap month value and an overlap day value indicating common months and days between the scheduled time period and the first time period, wherein the overlap time period includes the overlap month value and the overlap day value.

23. The computer-readable medium of claim 18, wherein the automatically identify the first set of input parameters further includes identify the first portion of the memory associated with the first client, the first set of input parameters being retrieved from the first portion of memory responsive to identifying the first portion.

24. The tangible, non-transient computer-readable medium of claim 18, further comprising a set of computer instructions for configuring the first object model and the new object model for unifying the proration calculation process for the plurality of clients of the service providers.

25. The computer-readable medium of claim 18, wherein the triggering event comprises at least one of a time-based alert for generating a prorated value, receiving an electronic notification of a termination or a subscription cancellation of the service that was offered by the service provider, and receiving an electronic notification to perform the proration calculation.

* * * * *